US010395403B1

(12) United States Patent
Hu

(10) Patent No.: US 10,395,403 B1
(45) Date of Patent: Aug. 27, 2019

(54) CYLINDRICAL PANORAMA

(71) Applicant: Altia Systems Inc, Cupertino, CA (US)

(72) Inventor: Shane Ching-Feng Hu, Fremont, CA (US)

(73) Assignee: Altia Systems, Inc., Cupertino, CA (US)

( * ) Notice: Subject to any disclaimer, the term of this patent is extended or adjusted under 35 U.S.C. 154(b) by 0 days.

(21) Appl. No.: 14/757,716

(22) Filed: Dec. 23, 2015

Related U.S. Application Data

(60) Provisional application No. 62/095,596, filed on Dec. 22, 2014.

(51) Int. Cl.
| | |
|---|---|
| *G06T 11/60* | (2006.01) |
| *G06T 7/00* | (2017.01) |
| *G06K 9/52* | (2006.01) |
| *G06T 7/60* | (2017.01) |
| *G06T 5/00* | (2006.01) |
| *G06K 9/46* | (2006.01) |

(52) U.S. Cl.
CPC .............. *G06T 11/60* (2013.01); *G06K 9/52* (2013.01); *G06T 5/006* (2013.01); *G06T 7/0028* (2013.01); *G06T 7/60* (2013.01); *G06K 2009/4666* (2013.01); *G06T 2207/20172* (2013.01); *G06T 2207/20221* (2013.01)

(58) Field of Classification Search
CPC ......... G06T 11/60; G06T 7/002; G06T 5/006; G06K 9/52
USPC .......................................................... 382/195
See application file for complete search history.

(56) References Cited

U.S. PATENT DOCUMENTS

| | | | | |
|---|---|---|---|---|
| 6,256,058 B1* | 7/2001 | Kang | ................... | H04N 5/2624 348/207.99 |
| 2012/0287222 A1* | 11/2012 | Liu | .................... | H04N 5/23238 348/14.07 |
| 2012/0300020 A1* | 11/2012 | Arth | ...................... | G06T 7/0046 348/36 |

OTHER PUBLICATIONS

Avidan et al: "Seam Carving for Content-Aware Image Resizing", ACM, 2007.*
Sawhney et al, "True Multi-Image Alignment and Its Application to Mosaicing and Lens Distortion Correction", IEEE, 1999.*

\* cited by examiner

*Primary Examiner* — Ruiping Li
(74) *Attorney, Agent, or Firm* — HM Law Group LLP; Vani Moodley, Esq.

(57) ABSTRACT

A method for generating a panoramic image is disclosed. The method comprises performing a cylindrical projection to project multiple camera images to cylindrical images, as a first step; and aligning overlapping regions of the cylindrical images, as a second step.

7 Claims, 6 Drawing Sheets

CYLINDRICAL PANORAMA

This application is a benefit of priority to US Provisional Patent Application No. 62/095,596 entitled "CYLINDRICAL PANORAMA", which is hereby incorporated herein by reference.

FIELD

Embodiments of the invention relate generally to multiple imager video systems that produce panoramic images through a process of stitching multiple images together.

BACKGROUND

Cylindrical panorama can be captured by anyone with a camera and a tripod capable of continuous panning. To avoid a parallax problem in the reproduced panorama, a fixture is placed between the camera and the tripod such that the camera can be rotated around the nodal point. To avoid tedious manual process, motorized high precision rotating gigs are commercially available. The multiple perspective images needs to be stitched and projected to a cylindrical panorama.

Instead of using a 2D perspective camera, a rotating 1D slit-scan camera can be used to produce cylindrical panorama directly without complicated registration and stitching process. However, such setup is only suitable for capturing static landscape panorama.

To produce high quality panorama video, requires capturing synchronized multiple images simultaneously at the video rate.

SUMMARY

In one aspect, the invention discloses a method for stitching images to form a panoramic image in a multiple imager camera based on a cylindrical projection. In one embodiment multi-camera images are projected to cylindrical images before alignment to reduce parallax effect of divergent multi-cameras. An adjustable radius may be used for cylindrical projection. The method may include alignment of overlapping regions and cylindrical projection radius adjustment may be integrated as an iterated calibration process. The method may include combined lens distortion, cylindrical projection as a single reverse address map, which can be subsampled to save memory space. Spatial differences, spatial gradient, temporal differences and skin tone detection may be incorporated as seam cut energy measurement. In one embodiment, the method may also incorporate hysteresis of seam offset point decision to maintain a temporally stable seam.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
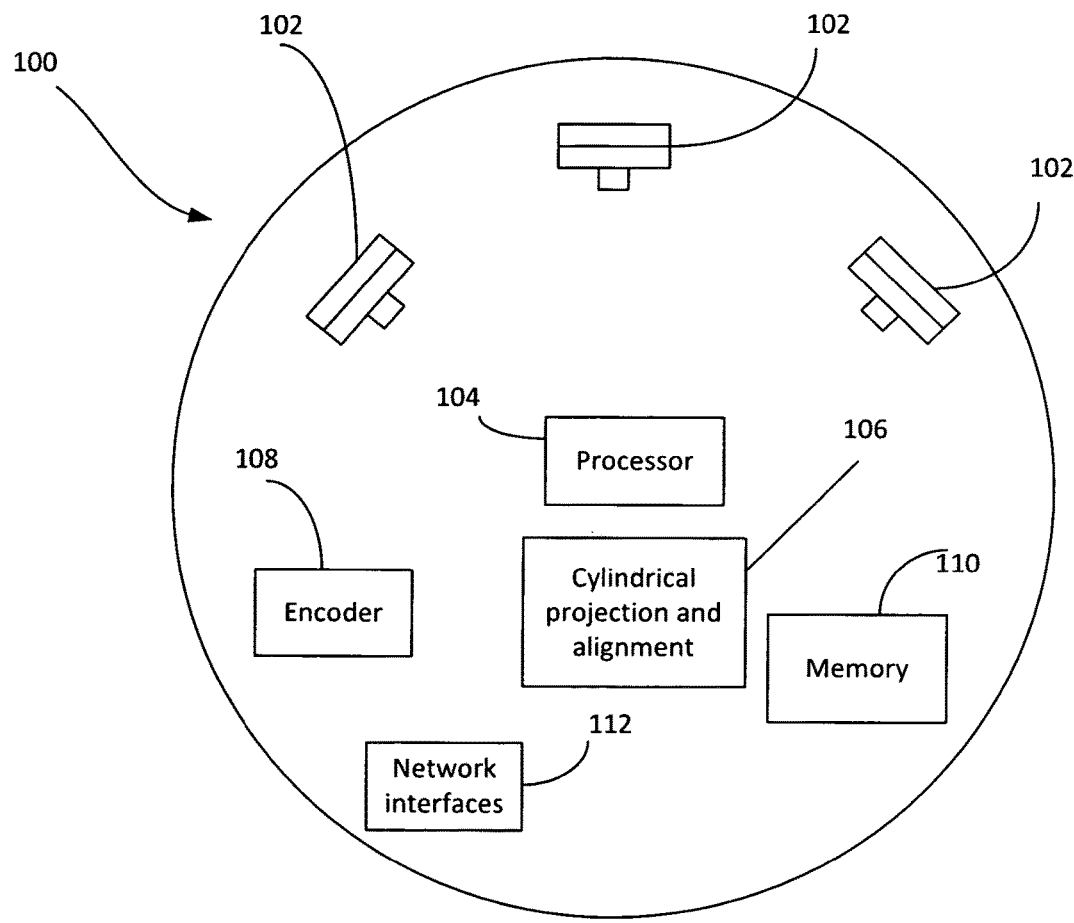
FIG. 1 shows an example of a camera with a divergent imager layout, in accordance with one embodiment of the invention.

Embodiments of the present invention disclose a panoramic video system (camera) with multiple synchronized imagers. The multiple imagers may be mechanically aligned in a semi-circular fashion in a horizontal plane as shown in FIG. 1 which shows an exemplary embodiment of a video imaging system 100 capable of produce panoramic images in accordance with the techniques disclosed herein. The system 100 includes multiple imagers/sensors 102 mounted along an arc such that each imager 102 is directed to capture a portion of a scene. Each imager 102 may include suitable sensors, for example charge-coupled device (CCD) or complimentary metal-oxide semiconductor (CMOS) imaging sensors, as is known in the art.

The system 100 may include logic/processor 104, cylindrical projection and alignment circuitry 106, encoder 108, memory 110, and one or more network interfaces 112. In one embodiment, digital signals recorded by sensors 102 are sent to the logic/processor 104 for processing. In one embodiment, the logic/processor 104 may execute programs for implementing image processing functions and calibration functions, as well as for controlling the operation of the entire device 100 including its image capture operations. Optionally, the logic/processor 104 may include signal processing functionality for performing image processing including image filtering and enhancement.

108. Although shown separately, in some embodiments, the circuitry 106, and 108 may exist as part of the logic/processor 104. It is to be understood that components of the device 100 may take the form of hardware, software, firmware, or any combination of hardware, software, and firmware.

Digital signals representing images may be stored in memory 110. The encoder 108 may compress digital signals before transmission via a network interface 112. The network interfaces 112 may be configured to provide network connectivity to the device 100. As such, the network interfaces 112 may include wireless and wired interfaces, in accordance with different embodiments.

The imagers 102 may be vertically aligned mechanically but may have a horizontally divergent placement in order to expand the horizontal field of view. Some overlapping field of view between each imager is necessary to enable seamless stitching.

In one embodiment, the individual cameras/sensors 102 are first calibrated to find the intrinsic matrix. Under normal usage conditions, each camera only has to be calibrated once. Based on the intrinsic parameters, perspective images are projected to cylindrical images. A geometric mapping may be achieved through an inverse address map, which is generated as part of the calibration process. A lens distortion correction may be incorporated into the inverse address map to save the extra stage of processing.

An alignment stage finds the overlapping width, vertical offset and scaling factor from the cylindrical images. The alignment of the images is highly dependent on the distance to the background. A default alignment is done with a nominal environment setup. An alignment process may be invoked when the panorama imager is moved to a new location.

A stitching stage first calculates the seam cut cost for the overlapping regions followed by the dynamic programming process to optimize the seam cut path. A blending stage reduces the visibility of the seam if any.

Calibration

Imagers need to be calibrated and aligned first before images can be projected and stitched together. In embodiment, the method uses checkerboard and the OpenCV camera calibration functions to find the intrinsic matrix and distortion coefficients.

Camera Intrinsic Matrix

Cameras are calibrated individually to find the intrinsic matrix:

$$\begin{matrix} f_x & 0 & C_x \\ 0 & f_y & C_y \\ 0 & 0 & 1 \end{matrix}$$

Where $f_x$ and $f_y$ are the focal length in x and y respectively. In one embodiment, the aspect ratio is 1, and the focal length is the same for x and y. Matrix elements $C_x$ and $C_y$ are the coordinates for the optical center.

Since most of the geometric processing is relative to the optical center $C_x$ and $C_y$, the origin of the image coordinate is first shifted to the optical center before the geometric transformation. This applies to the following description for lens distortion, cylindrical projection etc. The results are then shifted back to the display coordinate, i.e., zero based at the northwest corner.

Camera Lens Distortion

Cameras with short focal length lens typically exhibit barrel distortion. The formula for correcting the barrel distortion is:

$$x_{corrected} = x_{distorted} * (1 + k1 * r^2)$$
$$y_{corrected} = y_{distorted} * (1 + k1 * r^2)$$

Where k1 is the correction coefficient, r is the radius from the target pixel to the imager center. The tangential and higher distortion terms are ignored.

Note that the value k1 returned from OpenCV's functions is using the focal length as the normalization factor:

$$x_{dn} = \frac{x_{distorted}}{f}$$
$$y_{dn} = \frac{y_{distorted}}{f}$$
$$x_{cn} = x_{dn} * (1 + k1 * ((x_{dn})^2 + (y_{dn})^2))$$
$$y_{cn} = y_{dn} * (1 + k1 * ((x_{dn})^2 + (y_{dn})^2))$$

To calculate the reverse mapping, e.g., given undistorted $x_{cn}$ and $y_{cn}$, find the distorted $x_{dn}$ and $y_{dn}$ coordinates, the radius of the undistorted point needs to approximate the distorted radius first.

$$radSq_{distorted} = \frac{(x_{cn})^2 + (y_{cn})^2}{1 + k1 * ((x_{cn})^2 + (y_{cn})^2)}$$
$$x_{dn} = x_{cn} \frac{x_{cn}}{1 + k1 * radSq_{distorted}}$$
$$y_{dn} = y_{cn} \frac{y_{cn}}{1 + k1 * radSq_{distorted}}$$
$$x_{distorted} = x_{dn} * f$$
$$y_{distorted} = y_{dn} * f$$

Cylindrical Projection

From the intrinsic data, focal length f is known and is used to project perspective image on to a cylindrical image. To control the curvature, a radius scale factor is introduced such that the radius "R" of the cylinder is calculated as:

$$R = f * radiusFactor$$

The horizontal mapping from perspective coordinates to cylindrical coordinates is calculated as:

$$\propto = \arctan(x/f)$$
$$x_{cyl} = R * \propto$$

Where x and $x_{cyl}$ are the horizontal pixel offsets from the optical center.

Figure 2:
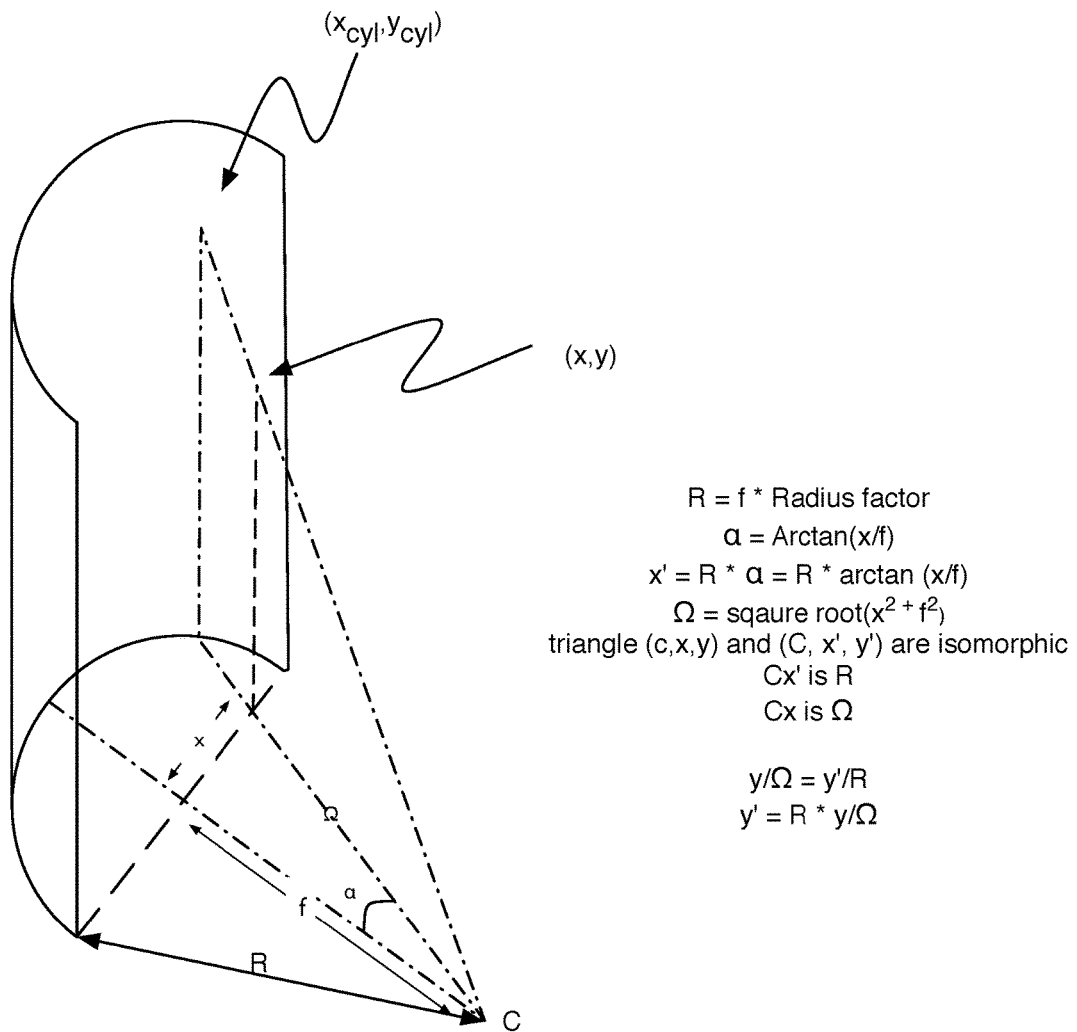
FIG. 2 is a schematic drawing illustrating cylindrical projection geometry, in accordance with one embodiment of the invention.

The vertical mapping is calculated as:

$$v = sqrt(x^2 + f^2)$$
$$y_{cyl} = R*(y/v)$$

Where y and $y_{cyl}$ are the vertical pixel offsets from the optical center. FIG. 2 illustrates the cylindrical projection geometry, in accordance with one embodiment of the invention.

Geometric Correction Map

In one embodiment lens distortion correction and cylindrical projection are consolidated into one single address mapping stage. To avoid sampling irregularities, the mapping is done in the reverse order, from destination to the source. The reverse mapping of the cylindrical projection is calculated first, followed by reverse distortion correction.

The resulted reverse address maps, one for x and one for y, are smooth and can be subsampled without causing significant artifacts. T reverse address map is only calculated for one quadrant, e.g., the first quadrant; the other three quadrant surfaces can be mirrored and reflected from the first quadrant surface. For example, with subsampling of 4 in each dimension, the total size of the reverse address map is 1/64th of the original size. In this way, substantial savings in memory size can be realized.

Warping

Given the reverse address map, all input perspective images are warped to cylindrical images. The lens distortion correction is embedded in the reverse address map along with the cylindrical projection.

Parallax

Figure 3:
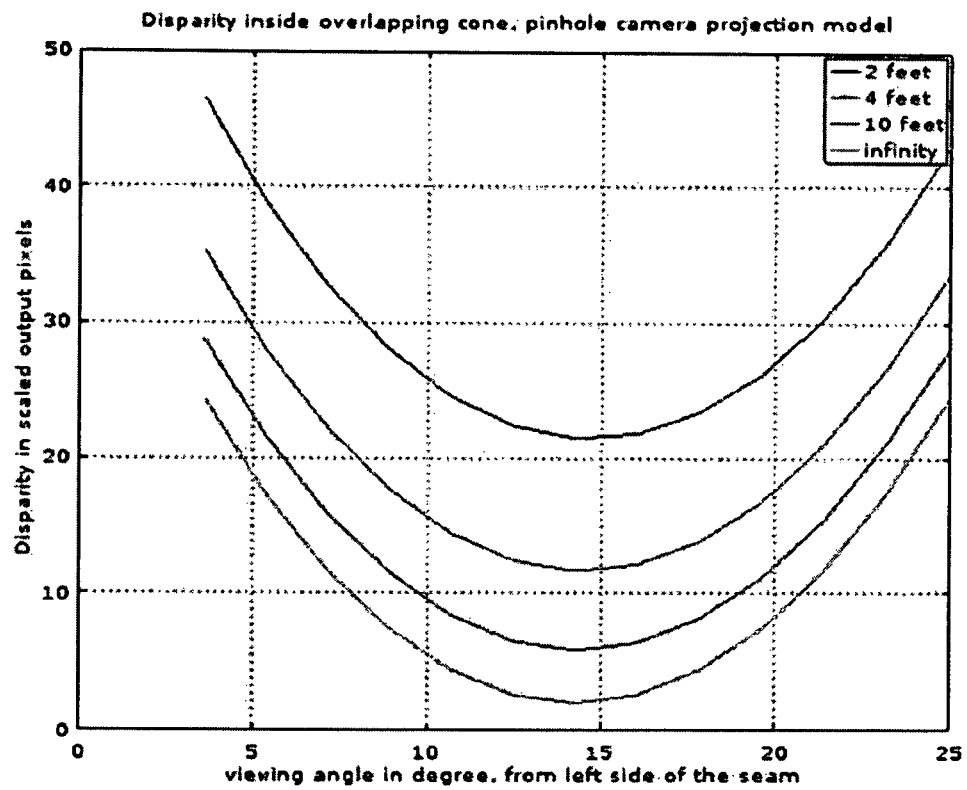
FIG. 3 shows a parallax disparity curve for overlapping perspective images.
Figure 4:
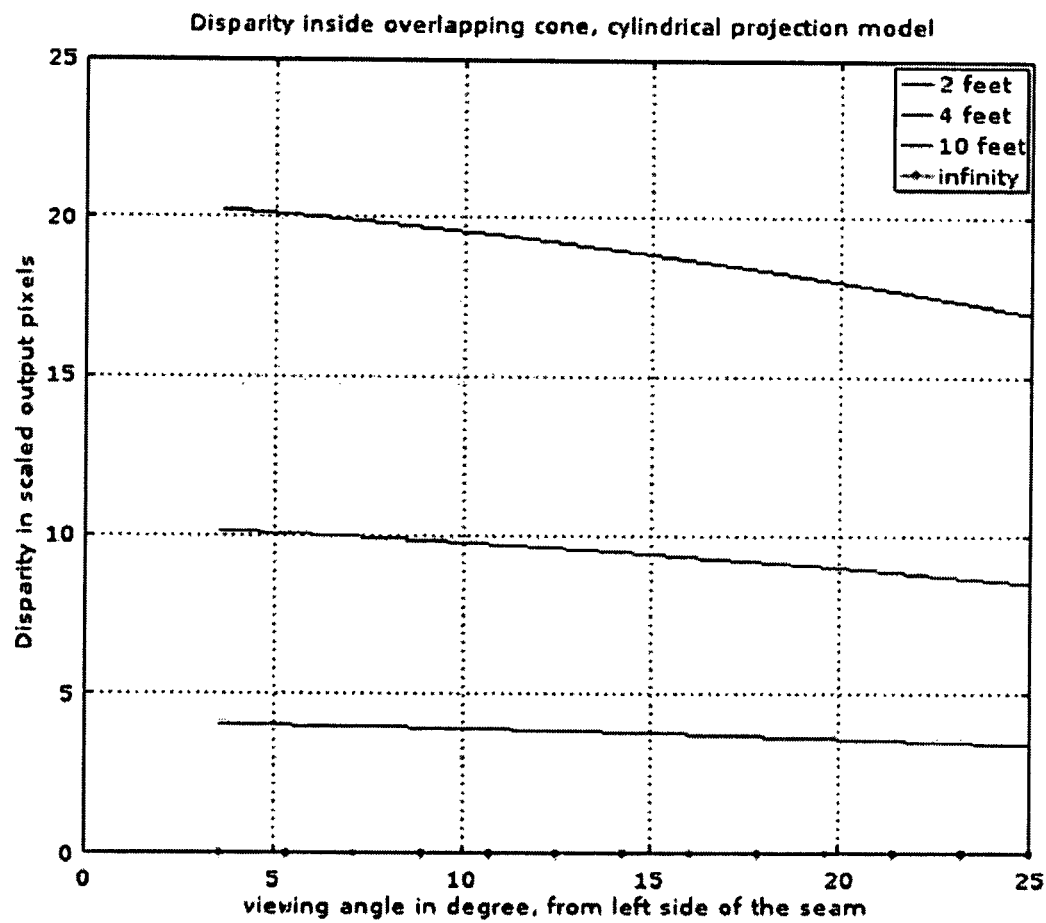
FIG. 4 shows a parallax disparity curve for overlapping cylindrical image.

Due to physical constraints, the optical center of all the cameras cannot occupy the same location. As a consequence, there is parallax disparity to be considered. A divergent camera layout will cause the disparity curve to be non-linear for the un-processed perspective images as shown in FIG. 3. After cylindrical projection, the parallax disparity in the overlapping region behaves mostly linear except for close distances as shown in FIG. 4.

Global Alignment

The center camera serves as the reference imager so that the left and right side alignment are not affecting each other. The alignment process propagates from the center to the end of the imager array.

The initial overlapping region between any two neighboring imagers is specified based on mechanical alignment.

The registration process finds the best global displacement for the overlapping region between neighboring imagers. Phase correlation may be used for this purpose as is described in *The Phase Correlation Image Alignment Method*", Kuglin and Hines, Proc. 1975 *Int'l. Conf on Cybernetics and Society*, pp. 163-165. Fine-tuning of the cylindrical radius scale is part of the alignment process such that the registration is optimized. A rigid transform may be used to find the scale factor between the two imagers.

The optimal displacement and scaling factor between the two imagers is determined based on an iterative approach.

The iterative alignment process interleaves a registration stage to find the displacement and a rigid transform stage to find the scaling factor. The registration runs first, followed by the rigid transform stage. When new scaling factor is found, the cylindrical projection is re-calculated and new overlapping region is updated for further registration refinement.

After the global alignment process is done, the overlapping width, vertical offsets are stored as part of calibration database. The reverse address map for the cylindrical projection is also updated with the calibrated scale factor.

Figure 5:
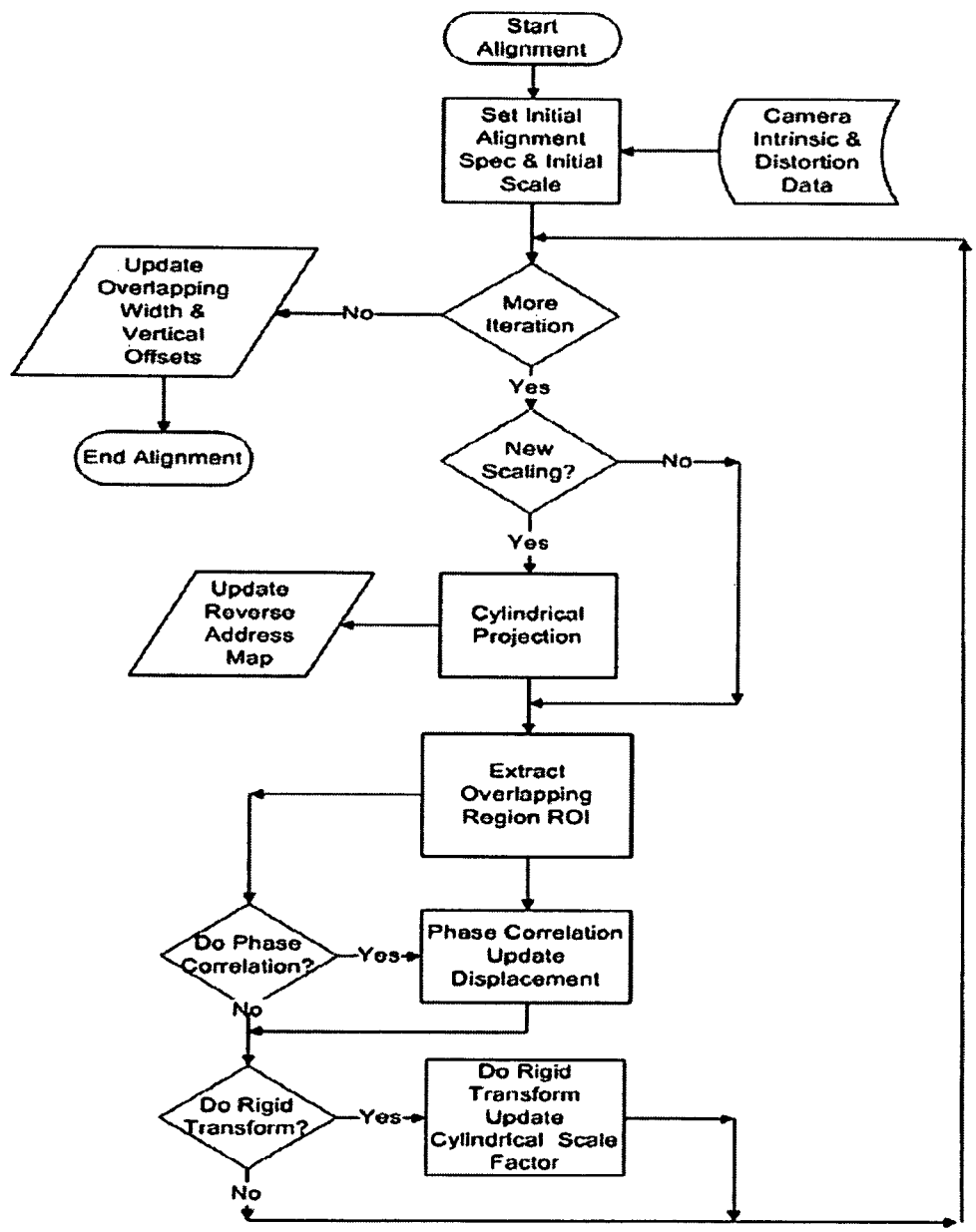
FIG. 5 shows a flowchart for an alignment process, in accordance with one embodiment of the invention.

FIG. 5 shows a flowchart of the alignment process, in accordance with one embodiment.

Phase Correlation

In one embodiment, a Fourier Transform based phase correlation method is used to compute the optimum global displacement between two equal size images. The magnitude information is normalized out such that only edge information is used for the cross correlation. This method is insensitive to exposure differences between imagers.

The method is based on the Fourier shift theorem. Suppose that two images differ only by displacement:

$$f_2(x, y) = f_1(x - d_x, y - d_y)$$
$$F_2(\omega_x, \omega_y) = F_1(\omega_x, \omega_y)e^{-i(\omega_x d_x + \omega_y d_y)}$$

The two images thus have the same Fourier magnitude but differ in phase angle directly proportional to the displacement. Therefore the cross-power spectrum provides the phase difference between the two images. The cross-power spectrum is given by:

$$e^{(\omega_x d_x + \omega_y d_y)} = \frac{(F_1(\omega_x, \omega_y)F_2^*(\omega_x, \omega_y))}{(|F_1(\omega_x, \omega_y)F_2^*(\omega_x, \omega_y)|)}$$

Taking the inverse Fourier transform of the cross-power spectrum results in a 2D surface with a single impulse at the position representing the displacement vector $[d_x, d_y]$.

The maximum correlation score is 1.0, i.e., the two images are the same, and 0.0 means the two images are completely different. For overlapping regions with a lot of textures, i.e., features with lines, corners etc., the correlation score will be high and the registration becomes trust-worthy. In one embodiment, a nominal correlation score of 0.2 is chosen as a confidence threshold. If the confidence factor is low, a warning message is issued to indicate that the overlapping region lacks texture and the registration result will not be used.

Rigid Transform

To compute the cylindrical scaling factor between two imagers, the rigid transform is used to compute an optimal, restricted affine transformation between the two overlapping images. The public domain OpenCV has an implementation of a general-purpose affine transformation package that may be used.

A corner finder function may be used to find the corners of the two overlapping regions. Corresponding feature points are found from the two corner sets. In one embodiment the rigid transform may be based on the techniques described in *A Combined Corner and Edge Detector*", Chris Harris & Mike Stephens, *Plessey Research*, United Kingdom, 1988. The restricted affine transform may be computed as follows:

Find a 2×2 matrix A and 2×1 vector b so that:

$$[A^* \mid b^*] = \underset{[A|b]}{\operatorname{argmin}} \sum_i (dst[i] - A * src[i] - b)^2$$

Where src[i] and dst[i] are the $i_{th}$ points in SRC and DST feature point lists, respectively.

Matrix A has the form of $$\begin{matrix} a_{11} & a_{12} \\ -a_{12} & a_{11} \end{matrix}$$

Vector b has the form of
b1
b2

The matrix element $a_{11}$ is the cylindrical scaling factor. If an optimal affine transformation cannot be found due to ill formed feature point set, the matrix A is set as an identity matrix.

Since OpenCV's feature matching stage assumes no particular camera configuration, the scope of matching search might be un-necessarily large if the imagers of the panoramic camera have a fixed mechanical configuration. The probability of false matching will increase if the scope of the search is larger than it needs to be. Thus, in one embodiment an improvement on the results obtainable by OpenCV's package may be achieved by incorporating a priori knowledge that the imagers are mechanically fixed and are laying on a horizontal plane. Starting with a selected "good" feature correspondence set, those with 'slant" angle greater than a set threshold are rejected as poor matches and are excluded from the original feature correspondence set. In this way, the transformation matrix becomes more accurate.

Stitching

Figure 6:
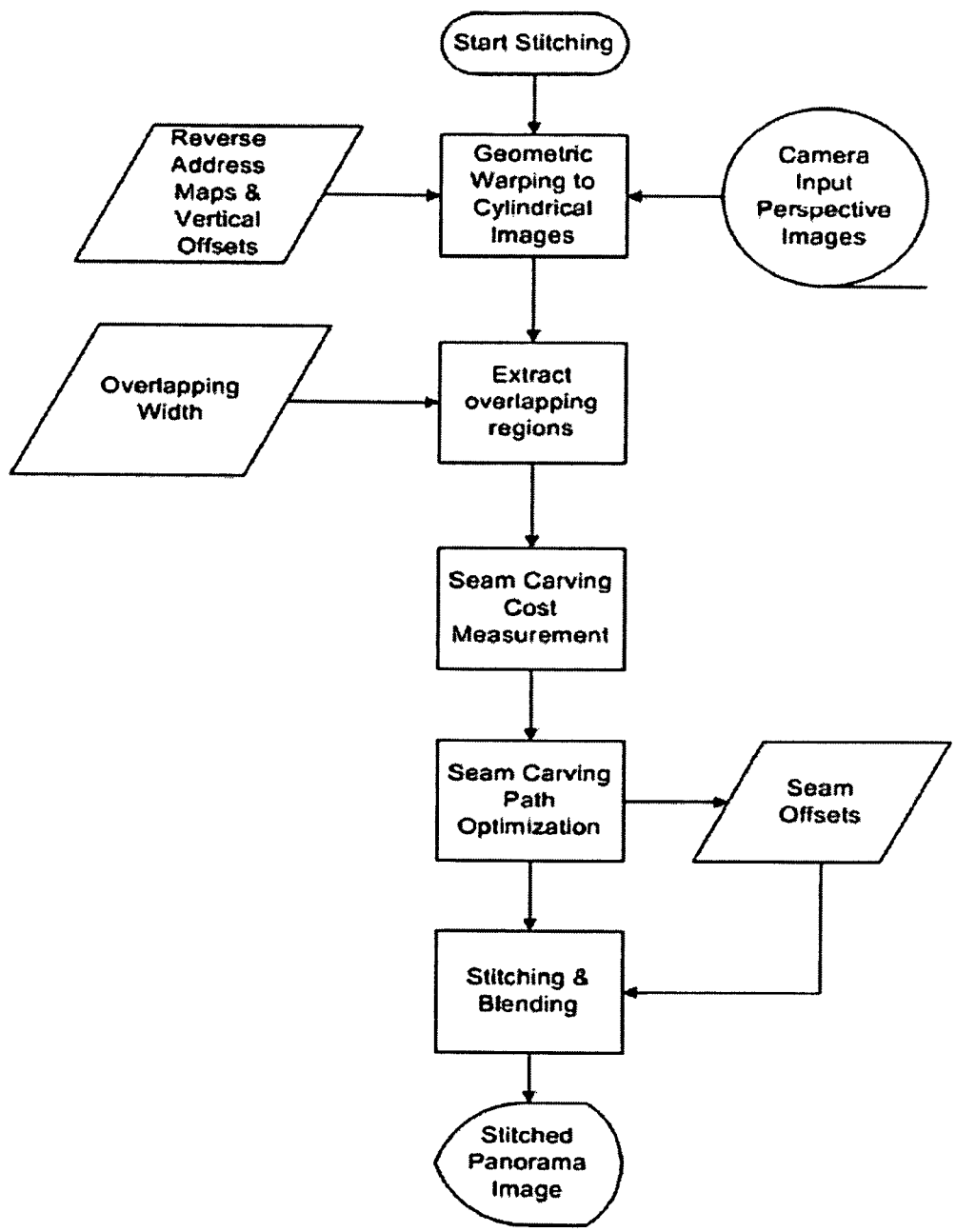
FIG. 6 shows a flowchart for a stitching process, in accordance with one embodiment of the invention.

FIG. 6 shows a flowchart for a stitching process, in accordance with one embodiment. The stitching process is designed to produce seamless panorama from multiple imagers.

Cylindrical Projection

In one embodiment, Input images are warped to cylindrical images as described in the warping section. Overlapping regions are extracted according to the alignment data for further processing. After projection, the cylindrical images are vertically aligned.

Seam Carving

Seam carving is an algorithm developed for content aware image resizing. A seam is an optimal 8-connected path of pixels on a single image from top to bottom, or left to right, where optimality is defined by image energy measurements. Various visual saliency measures may be used to define an energy function. Seams with low energy may be removed with minimum visibility. In one embodiment, an optimal low energy path from the overlapping region between images maybe used to stitch the images together with a minimum visible seam. More sophisticated energy functions may be used to minimize visual problems caused by geometric misalignment and local parallax disparity.

Seam Carving Energy Measurements

For every pixel in the overlapping region, several visibility saliency measurements may be calculated to construct a seam cut cost map. In general, it is desirable to place the seam at locations where visibility saliency is low. In order to balance the scaling differences, each type of measurement contributes to the summary energy with a unique weight.

Spatial Alignment Measure

The seam will be less visible if the seam is placed at locations where left and right images are aligned. For each pixel in the overlapping region, the method may use an absolute difference of luminance (Y) to measure the goodness of the alignment based on the following equation:

$$e_s(x,y) = \operatorname{abs}(Y_l(x,y) - Y_r(x,y))$$

Where $Y_l$ & $Y_r$ are the luminance signal from the left image and right image of the overlapping regions respectively.

Gradient Measure

It is beneficial to place seams at locations where there are no textures, i.e., flat regions. The method may calculate luminance and chrominance gradients as follows:

$$e_g(x, y) = \left|\frac{\partial Y}{\partial x}\right| + \left|\frac{\partial Y}{\partial y}\right|$$

$$e_g(x, y) \mathrel{+}= \left|\frac{\partial C_r}{\partial x}\right| + \left|\frac{\partial C_r}{\partial y}\right|$$

$$e_g(x, y) \mathrel{+}= \left|\frac{\partial C_b}{\partial x}\right| + \left|\frac{\partial C_b}{\partial y}\right|$$

The equivalent 3×3 convolution mask is:

$$\begin{matrix} 0 & 1 & 0 \\ 1 & 0 & -1 \\ 0 & -1 & 0 \end{matrix}$$

Temporal Difference Measurement

For teleconferencing systems where the camera is stationary, the background is also stationary. In this type of usage, the seams should be placed at background regions. One simple way to find it with high probability is to calculate temporal frame differences. Suppose the seam cut point for the previous frame is at k, the contribution from the left region is from index 0 to k:

$$e_t(x,y)_{x=0 \text{ to } k} = |Y_l(x,y) - Y_{lp}(x,y)| + |Cr_l - Cr_{lp}| + |Cb_l - Cb_{lp}|$$

The contribution from the right region is from index k to w, where w is the seam width.

$$e_t(x,y)_{x=k+1 \text{ to } w-1} = |Y_l(x,y) - Y_{lp}(x,y)| + |Cr_l - Cr_{lp}| + |Cb_l - Cb_{lp}|$$

Skin Tone Measurement

A binary mask field (0, 1) may be created for every pixel in the overlapping region. It is initialized to be all 0. A skin tone detector will set the mask if skin tone is detected. For regions where the mask is set, the method assigns a constant energy value.

$$e_s = \operatorname{mask}(x,y) * \operatorname{skinToneEnergy}$$

Variations of skin tone detection techniques and associated working color spaces, such as RGB, $YC_bC_r$, YIQ, HSV etc., may be used to perform the skin tone detection.

The YIQ color space is derived from rotated $YC_bC_r$ color space. The luminance component Y remains the same, while the $C_b$, $C_r$ axis is rotated 33 degrees counter clockwise to form the IQ axis. The degree of rotation was chosen such that skin tone cluster lies centered on the "I" line. Most people's skin tone varies in the "I" range from 20 to 90. The vector scope, which is one of the instruments commonly used in the studio, shows an "I" line to monitor the mapping of skin tones.

In one embodiment, an internal pipeline processes $YC_bC_r$ video. Thus the method uses the $YC_bC_r$ video color space in one embodiment to avoid the expense of translating between different color spaces.

One way to approximate the "I" line cluster is to define a range each for $C_b$ and $C_r$ signal. When $C_b$ & $C_r$ both lie inside its range, skin tone is detected. Typical ranges include 96 to 124 for $C_b$ and 132 to 163 for $C_r$. In one embodiment, the threshold ranges may be calibrated against a camera's colorimetric response.

The luminance component may be eliminated in one embodiment so that skin tone detector works under difference lighting conditions.

Summary Energy Cost

For each pixel in the overlapping region, the summary energy value is the weighted sum of all the measurements:

$$E = w_s * e_s + w_g * e_g + w_t * e_t + w_s * e_s$$

Seam Carving Path Optimization

Given a map of summarized energy measure, the optimum seam path may be found using the principle of dynamic programming. In one embodiment, the Viterbi Algorithm ("Seam Carving for Content-Aware Image Resizing", S. Avidan, A. Shamir, Mitsubishi Electric Research Labs) yields an optimum solution to dynamic programming problems.

In one embodiment, first, the local cumulative minimum energy is calculated from the second top row to the bottom row as follows:

$$Em(x,y) = E(x,y) + \min(Em(x,y-1), Em(x-1,y-1), Em(x+1,y-1))$$

The second step is a back tracking stage to find seam cut offsets from the bottom row up. The minimum of the bottom row is the seam cut point for the bottom row. Working from the bottom row upwards, from the last known seam cut point, the method chooses the next seam cut point from one of the 3 immediate neighbors of the upper row. The pixel location with the minimum energy is the seam cut point for the upper row. To reduce the temporal seam path variations, hysteresis is incorporated in one embodiment as follows:

Seam Offset Hysteresis

To maintain temporal consistency of the seam path with respect to noise, for pixel location corresponds to the last frame's seam path, the accumulated energy may be multiplied in one embodiment by a pre-determined factor. Typically, this factor reduces the accumulated energy by a few percentages. Setting the factor to exactly 1 can effectively disable the hysteresis.

Stitching and Blending

The output panoramic image may be produced by stitching the images together based on the optimum seam path found. Various stitching techniques may be used. For example the stitching techniques described in "*Image alignment and stitching: A tutorial*", Richard Szeliski, *Microsoft Research*, 2004 or "*Automatic Panoramic Image Stitching using Invariant Features*", M Brown & D. Lowe, *International Journal of Computer Vision*, 74(1), pp. 59-73, 2007 may be used. In one embodiment for each output row, feathering may be performed to blend the two images around the seam cut point. The feathering weights each image proportional to its distance from the seam cut point and is effective if the exposure and color balance is globally optimal.

If there are issues with exposure and color balance, more powerful blending methods such as pyramid blending as described in "*A multi-resolution spline with application to image mosaics*", P. J. Burt & E. H. Adelson, *ACM Transactions on Graphics*, pp. 217-236, 1983 or gradient domain blending as described in "*Poisson image editing*", P. Perez, M Gangnet & A. Blake, *ACM Transaction on Graphics*, pp. 313-318, 2003 may be used, but at much higher cost of computation.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for generating a panoramic image, comprising:
capturing images simultaneously from each of multiple camera sensors aligned horizontally along an arc and having an overlapping field of view;
performing a cylindrical projection to project each of the captured images from the multiple camera sensors to cylindrical images; and
aligning overlapping regions of the cylindrical images corresponding to the overlapping field of view based on absolute difference of luminance, wherein the cylindrical projection is performed by adjusting radius for the cylindrical projection, wherein the adjusting the radius is based on a scale factor and wherein the scale factor is calculated based on a rigid transform.

2. The method of claim 1, wherein aligning the overlapping regions and adjusting the radius is performed as an integrated step.

3. The method of claim 2, wherein said integrated step is part of an iterated calibration process.

4. The method of claim 3, wherein a correction for lens distortion and the cylindrical projection is combined as a single reverse address map.

5. The method of claim 4, wherein the single reverse address map is subsampled.

6. The method of claim 1, further comprising performing seam cut energy measurement techniques on the cylindrical images.

7. The method 7, further comprising using offset point to maintain a temporary stable seam across the cylindrical images.

* * * * *